US008186929B2

(12) United States Patent
Todd

(10) Patent No.: US 8,186,929 B2
(45) Date of Patent: May 29, 2012

(54) HIGH DENSITY VARIABLE ACCESS STORAGE LIBRARY

(75) Inventor: Christian Allen Todd, Parker, CO (US)

(73) Assignee: Quantum Corporation, San Jose, CA (US)

( * ) Notice: Subject to any disclaimer, the term of this patent is extended or adjusted under 35 U.S.C. 154(b) by 968 days.

(21) Appl. No.: 12/185,736

(22) Filed: Aug. 4, 2008

(65) Prior Publication Data

US 2010/0028110 A1  Feb. 4, 2010

(51) Int. Cl.
  *B65G 57/00* (2006.01)
(52) U.S. Cl. .................................. 414/331.01; 414/807
(58) Field of Classification Search .................. 414/277, 414/331.01, 331.06, 331.02, 331.05, 807; 211/1.51, 1.52, 1.57, 41.12; 369/30.39
See application file for complete search history.

(56) References Cited

U.S. PATENT DOCUMENTS

| | | | | |
|---|---|---|---|---|
| 5,285,333 A * | 2/1994 | Barr et al. ..................... | 360/92.1 |
| 6,144,519 A * | 11/2000 | Hanaoka et al. ............. | 360/92.1 |
| 6,215,611 B1 * | 4/2001 | Gibbons ....................... | 360/92.1 |
| 6,438,623 B1 * | 8/2002 | Ryan .................................. | 710/2 |
| 6,648,574 B2 * | 11/2003 | Williams ....................... | 414/277 |
| 6,671,580 B2 * | 12/2003 | Campbell et al. ............. | 700/245 |
| 6,808,353 B2 * | 10/2004 | Ostwald et al. ............... | 414/273 |
| 6,851,909 B2 * | 2/2005 | Campbell et al. ............. | 414/268 |
| 6,956,715 B2 * | 10/2005 | Mueller et al. ............... | 360/92.1 |
| 7,032,762 B2 * | 4/2006 | Miyazaki et al. ............. | 211/162 |
| 7,274,531 B2 * | 9/2007 | Dickey et al. ................. | 360/92.1 |
| 7,508,621 B2 * | 3/2009 | Pollard et al. ................. | 360/92.1 |
| 7,974,040 B2 * | 7/2011 | Green et al. ................... | 360/92.1 |
| 2003/0117744 A1 * | 6/2003 | Tanaka ............................ | 360/92 |
| 2007/0110546 A1 * | 5/2007 | Budny et al. ............. | 414/331.01 |
| 2007/0206320 A1 * | 9/2007 | Christie, Jr. ..................... | 360/92 |

* cited by examiner

*Primary Examiner* — Joshua Rudawitz
(74) *Attorney, Agent, or Firm* — Roeder & Broder llp; James P. Broder

(57) ABSTRACT

A media storage library for storing a plurality of media cartridges is provided. The media storage library includes at least one media transfer mechanism, and a plurality of storage panels for storing media cartridges, including at least a first movable storage panel. The first storage panel is movable from the first position to a second position, and each storage panel of the plurality of movable storage panels includes at least a first access face for the at least one media transfer mechanism to access the media cartridges. An access space is formed between the first movable storage panel and a second storage panel, and the at least one media transfer mechanism is able to access the media cartridges via the access space and the first access face.

18 Claims, 10 Drawing Sheets

HIGH DENSITY VARIABLE ACCESS STORAGE LIBRARY

BACKGROUND OF THE INVENTION

Automated storage libraries including, for example, magnetic tape cartridges, may improve the access speed and reliability of data storage systems having large numbers of magnetic tape cartridges. Automated storage library systems typically include a plurality of storage media devices, a transport mechanism, and one or more storage media drives in communication with a computer system for inputting and outputting desired information to and from the plurality of media devices.

Storage media devices such as cartridges housing magnetic tape with data stored thereon have proven to be an efficient and effective medium for data storage in computer systems, including automated storage libraries. Automated storage libraries including tape cartridges generally have a plurality of storage panels with magazines for storing tape cartridges, a retrieval/transport mechanism (often referred to as a "robot"), and one or more tape drives. The transport mechanism may be controlled to select a specific storage tape cartridge from the library and transfer the tape cartridge between a storage slot and a tape drive within seconds. The transport mechanism typically is associated with a gripper or hand mechanism (often referred to as a "picker") positioned on the transport mechanism to controllably retrieve and transport a tape cartridge within the storage library.

In order to be able to store the maximum amount of data in the least amount of space, the ideal data storage library would have the tape cartridges organized so that the maximum storage density per square foot is obtained. Unfortunately this may prohibit access to some of the media. Most storage libraries have fixed storage panels or racks for the cartridges. Previously, to increase storage density in automated tape libraries, tape cartridges have been organized in rotating towers, stacking tape cartridges at least two deep in a storage rack, stacking tape cartridges in a removable tray, and storing tape cartridges back-to-back, for example.

However, these types of systems require complex systems for accessing the tape cartridges. Furthermore, most of these approaches rely on relatively fixed tape cartridge locations. All of these libraries also place approximately the same priority to accessing any cartridge even though some data may not be used for extended periods of time.

Therefore, a media storage library with minimal space between cartridges to achieve high densities and areas within that library that can be assigned lower exchange rates (i.e., high frequency of use versus low frequency of use), is desired.

BRIEF SUMMARY OF THE INVENTION

In accordance with embodiments of the invention, a media storage library for storing a plurality of media cartridges is provided. The media storage library includes at least one media transfer mechanism, and a plurality of storage panels for storing media cartridges, including at least a first movable storage panel. The first storage panel is movable from the first position to a second position, and each storage panel of the plurality of movable storage panels includes at least a first access face for the at least one media transfer mechanism to access the media cartridges. An access space is formed between the first movable storage panel and a second storage panel, and the at least one media transfer mechanism is able to access the media cartridges via the access space and the first access face.

In some embodiments, the plurality of storage panels may include a second access face, where the second access face is not accessible to the at least one media transfer mechanism in the first position. In the second position, the first movable storage panel is in the access space so that the at least one media transfer mechanism is able to access the second access face for accessing the media cartridges of the first movable storage panel.

Further, in some embodiments, the media cartridges stored in the first access face of the first storage panel are high activity media cartridges, and the media cartridges accessible by the second access face are low activity media cartridges.

In accordance with other embodiments of the invention, a media storage library for storing a plurality of media cartridges is provided. The media storage library includes at least one media transfer mechanism and a plurality of movable storage panels for storing media cartridges, including at least a first movable storage panel and a second storage panel. Each storage panel includes a first access face for the at least one media transfer mechanism to access the media cartridges, and the first storage panel and a second storage panel are configured in a first position such that an access face of the first movable storage panel opposes an access face of the second storage panel, and the first movable storage panel and the second storage panel form an access space between the first movable storage panel and the second storage panel. The at least one media transfer mechanism is able to access the media cartridges via the access space.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims.

Figure 1:
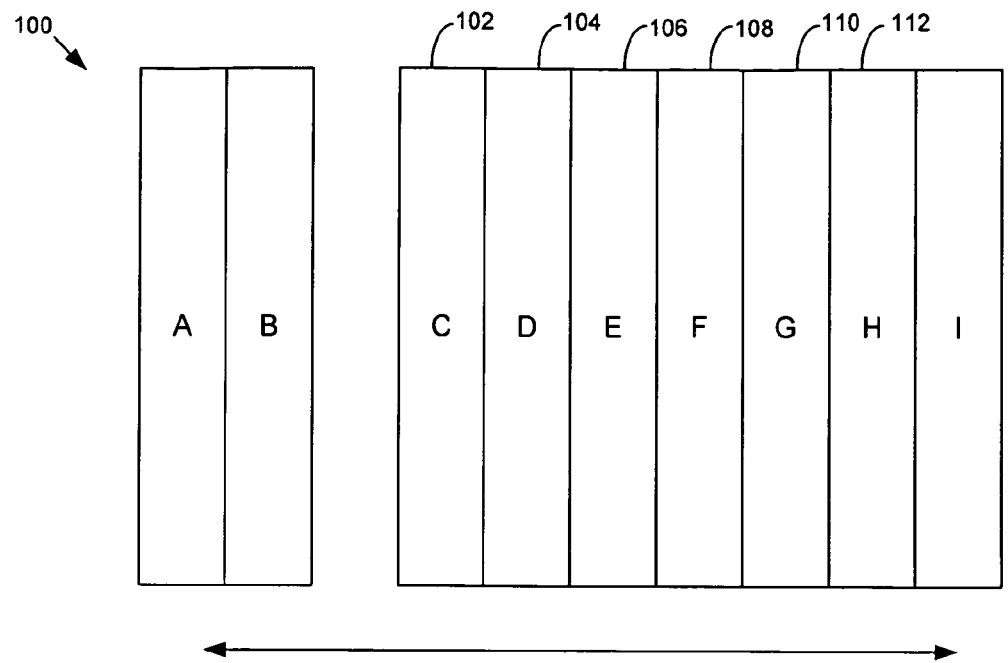
FIG. 1 shows an example of moving media storage panels in a media storage library according to prior art.

The present invention and its various embodiments are better understood upon consideration of the detailed description below in conjunction with the accompanying drawings and claims.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

The examples described herein are generally described with reference to a magnetic media library system including multiple magnetic tape cartridges and magnetic tape drives. It should be understood, however, that the various examples are contemplated for use with other types of storage media devices and storage media drives. For example, a storage library may include magnetic disks, optical media devices, and the like alone or in combination with other media storage devices and corresponding media drives.

In one example, a storage library includes a housing having a plurality of storage bins for housing storage cartridges and a robotic transporter/retriever mechanism for transporting storage cartridges between the storage panels and one or more tape drives. The library housing includes an opening or slot wherein a plurality of drive modules may be received. A control module may include a frame configured to support one or more tape drives, a power supply, and interface communication electronics to support the one or more tape drives. In one example, the control module includes a number of drives less than the maximum number of drives that may be included in the library housing.

Capacity of an automated storage library is often limited by the configuration of the storage panels. Storage panels storing the media must be positioned so that a media transfer mechanism, e.g., a robot associated with a picker, is able to access the media.

For example, current automated storage libraries may hold about 740 tape cartridges per square meter. Connecting expansion modules to a control module may increase the data storage density since each expansion module may lack tape drives and, as a result, be able to store more tape cartridges. Density may be increased to 1600 cartridges per square meter, for example.

Embodiments of the invention allow increased capacity of media storage with rapid accessibility. In accordance with some embodiments of the invention, a storage library configuration can be expanded up to have a data storage density of over 2400 cartridges per square meter.

FIG. 1 illustrates a current example of configuration for movable storage panels with a media storage library. Capacity of the storage library is increased by stacking media storage panels. In the configuration 100, storage panels 102, 104, 106, 108, and 110 must be moved in order to access the media cartridges stored in storage panel 112. In other words, moving multiple storage panels is necessary or moving more than one storage panel. Moving the storage panels in this manner increases the time it takes for a media transfer mechanism to access the correct media cartridge and load into the media drive. Furthermore, large storage panels storing a plurality of media cartridges are heavy, which requires a large amount of power and effort to move each storage panel. Additionally, in the configuration shown in FIG. 1, there is no direct access to the media cartridges, so that unless the previously retrieved media cartridge is located in the same aisle as the media cartridge to be retrieved next, at least one storage panel would have to be moved.

According to embodiments of the invention, an access space is provided for a media transfer mechanism to access media cartridges stored in storage panels. The access face of the storage panel along the access space face into the access space. In this way, high activity media cartridges may be stored in the storage panel with the access face facing toward the access space so that the media transfer mechanism may access these media quickly.

Figure 2:
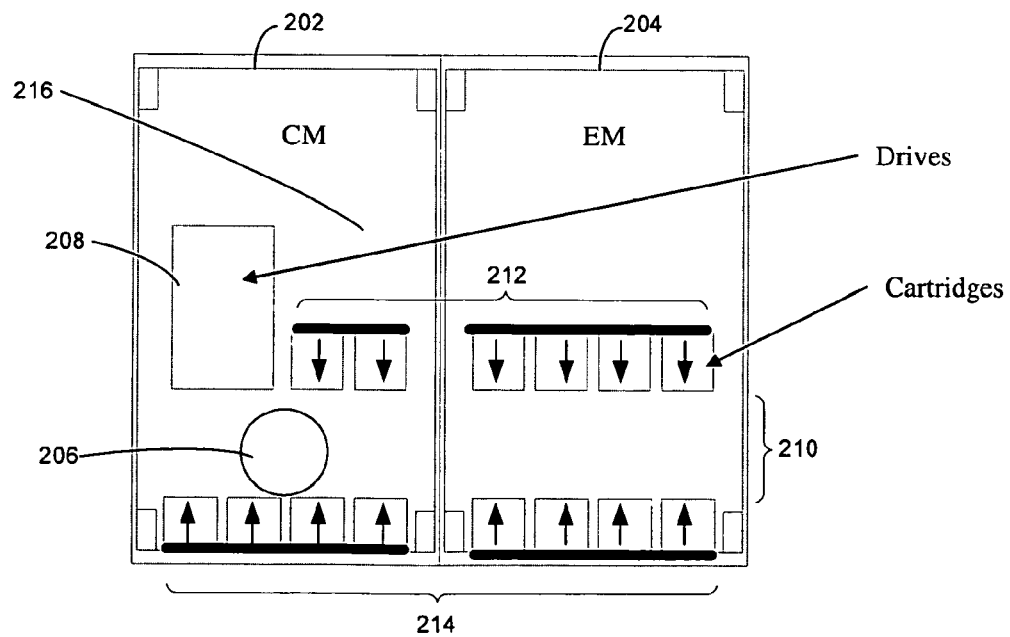
FIG. 2 shows fixed wall storage panels in a media storage library.

A fixed wall storage panel media storage library is illustrated in FIG. 2. In addition to the control module 202, an expansion module 204 is added to the main module 202 to increase storage capacity of the library. The media transfer mechanism 206 transfers media from the fixed wall storage panels to the media drives 208. In the configuration of the fixed wall storage panels 212 and 214, an access space 210 is formed between the fixed wall storage panels 212 and 214 for the media transfer mechanism 206 to travel through to access the media cartridges stored in fixed wall storage panels 212 and 214. The access faces of the fixed wall storage panels 212 and 214 face toward the access space 210 so that the media transfer mechanism 206 may access the media.

However, because storage panels 212 and 214 are fixed wall storage panels, it is not possible to store media in locations that are blocked by storage panels 212 and 214. For example, there can be no additional storage panels stored in area 216 because the media transfer mechanism will not be able to access them.

Figure 3:
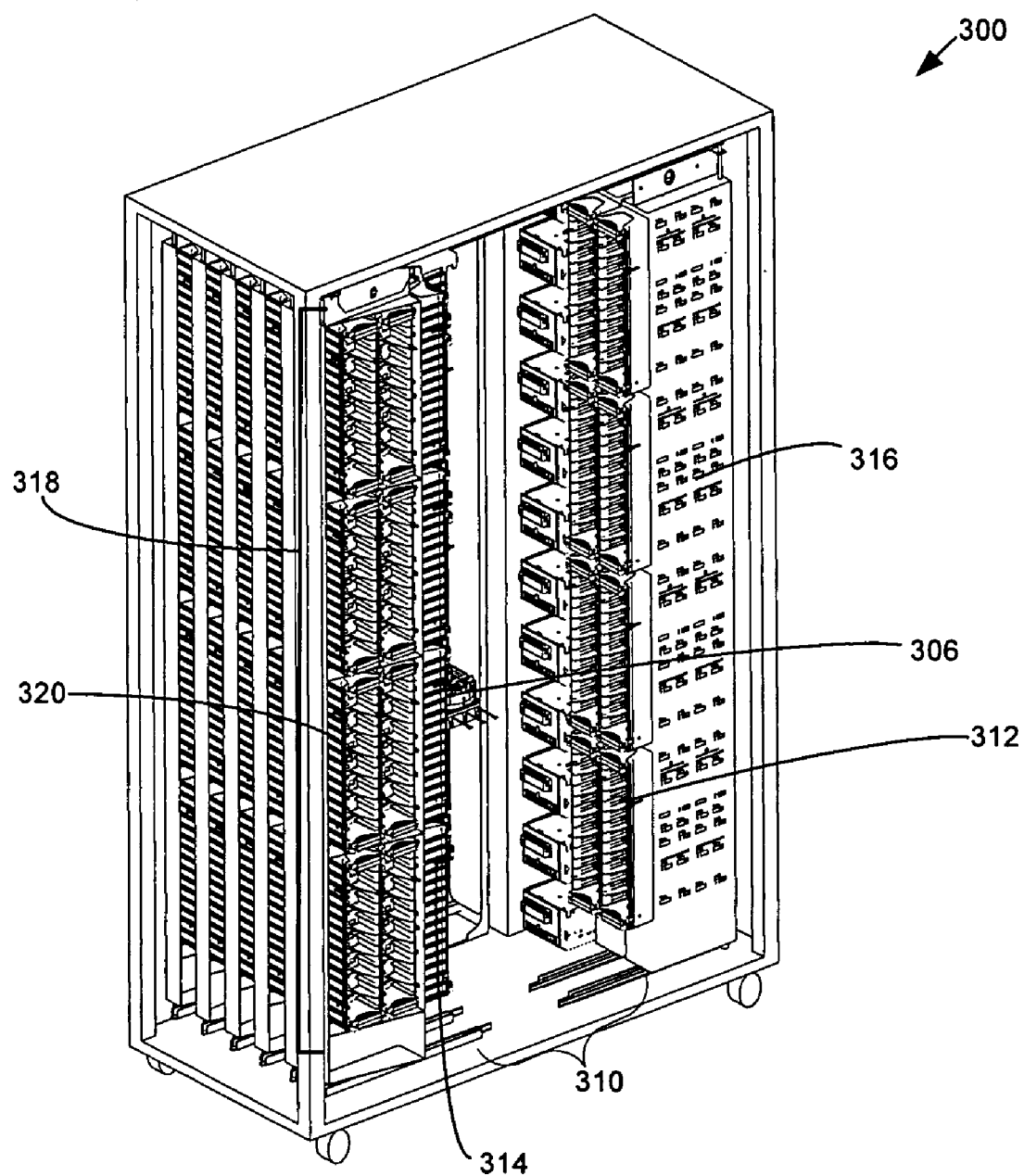
FIG. 3 shows a perspective view of a media storage library according to embodiments of the invention.

FIG. 3 illustrates a perspective view of a media storage library 316 according to embodiments of the invention. A media transfer mechanism 306 is able to move in the access space 310 to transfer media from storage panels, e.g. a first storage panel 316 and a second storage panel 318, to media drives 308. As utilized herein, the access space 310 can be defined as the space between the first storage panel 316 and the second storage panel 318 when the storage panels 316 and 318 are in a first position. Stated another way, storage panels for the media are positioned on both sides of the access space 310. For example, the first storage panel 316 and the second storage panel 318 are on opposite sides of the access space 310. A first access face 312 of the first storage panel 316 is oriented toward the access space 310. Similarly, a first access face 314 of the second storage panel 318 is oriented into the access space 310. The access faces 312 and 314 are easily accessed by the media transfer mechanism 306 via the access space 310. The accessibility of access faces 312 and 314 that are oriented into the access space 310 may include high activity media cartridges, which can be accessed rapidly.

On the other hand, in embodiments of the invention, the movable second storage panel 318 includes a second access face 320, for example. The second access face 320 is not accessible to the media transfer mechanism 306 until the movable second storage panel 318 is moved into the access space 310. Moreover, as illustrated in this embodiment, the first access face 314 and the second access face 320 of the second storage panel 318 are not parallel to one another, i.e. are angled relative to one another. More specifically, in one embodiment, the first access face 314 and the second access face 320 of the second storage panel 318 are substantially perpendicular to one another. During use, the movable storage panels. e.g., the second storage panel 318, may be moved into a second position where the second storage panel 318 is positioned substantially within the access space 310 by the media transfer mechanism 306 or an individual motor, for example.

Therefore, according to embodiments of the invention, the effective size of the library and speed of accessibility can be changed depending on which storage panel is moved into the access space. Furthermore, embodiments allow for partitioning, bulk loading, towers and dual aisle applications.

Figure 4:
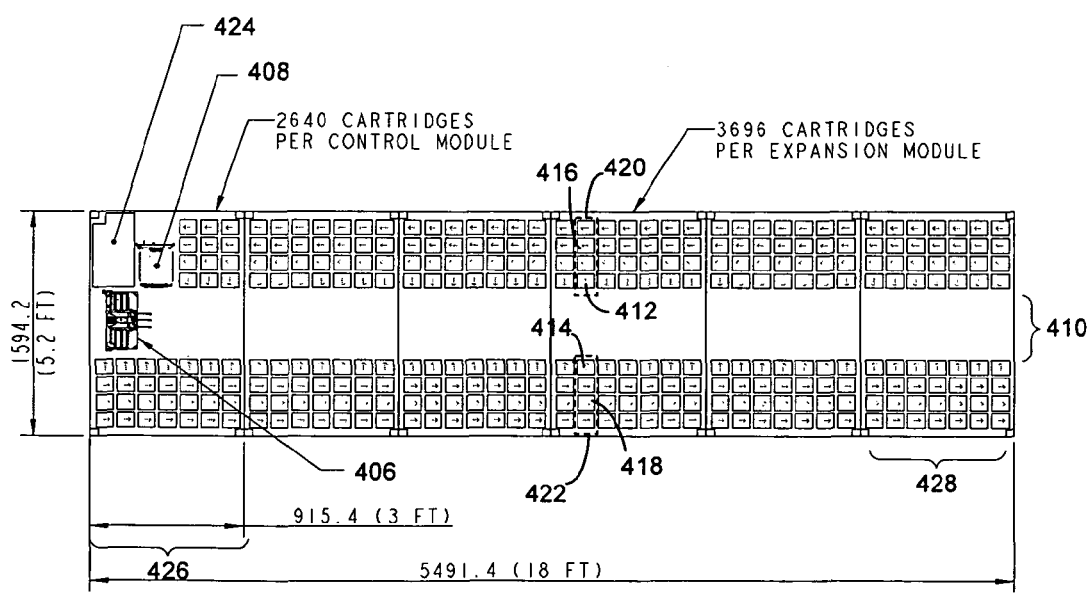
FIG. 4 shows a top plan view of a media storage library with expansion modules according to embodiments of the invention.

FIG. 4 shows a top plan view of a media storage library with expansion modules according to embodiments of the invention. The media storage library includes a control module 426 and several expansion modules 428 for increased storage capacity. Each of the modules 426 and 428 include a plurality of storage panels, e.g., a first storage panel 420 and a second storage panel 422. Housed in the control module are electronics 424. The electronics 424 may include a power supply, and interface communication electronics to support the one or more media drives, for example. The automated storage library includes a media transfer mechanism 406, which transfers media from the storage panels 420, 422 to the media drives 408. In embodiments, the storage library may include more than one media transfer mechanism. The plurality of storage panels are configured so that there is an access space 410. For example, when each of the storage panels 420 and 422 is in a first position, at least a portion of the access space 410 is formed substantially directly between the first storage panel 420 and the second storage panel 422. The media transfer mechanism 406 may travel through the access space 410 to access media stored in any of the storage panels.

For example, the media transfer mechanism 406 can access media stored in storage panels 420 and 422. However, in the first position, the media transfer mechanism 406 may access media on a first access face of the storage panels, such as a first access face 412 of the first storage panel 420, and a first access face 414 of the second storage panel 422. The first access faces 412 and 414 may store media cartridges that are accessed often because the media transfer mechanism 406 is able to access the media without moving storage panels 420 and 422.

Each of the storage panels 420 and 422 may be moved out into the access space 410 such that a second access face 416 and 418, respectively, is accessible by the media transfer mechanism 406. For example, when the first storage panel 420 is moved to a second position out into the access space 410, the media cartridges are stored such that the second access face 416 is accessible by the media transfer mechanism 406. Similarly, the second access face 418 of the second storage panel 422 is accessible by the media transfer mechanism 406 when the second storage panel 422 is moved to a second position out into the access space 410. However, because the first storage panel 420 opposes the second storage panel 422, storage panels 420 and 422 may not be moved into the access space 410 at the same time. Moreover, as illustrated, the first access face 412 and the second access face 416 of the first storage panel 420 are not parallel to one another.

More specifically, in one embodiment, the first access face 412 and the second access face 416 of the first storage panel 420 are substantially perpendicular to one another. Somewhat similarly, as illustrated, the first access face 414 and the second access face 418 of the second storage panel 422 are not parallel to one another, i.e. are angled relative to one another. More specifically, in one embodiment, the first access face 414 and the second access face 418 of the second storage panel 422 are substantially perpendicular to one another.

Figure 5A:
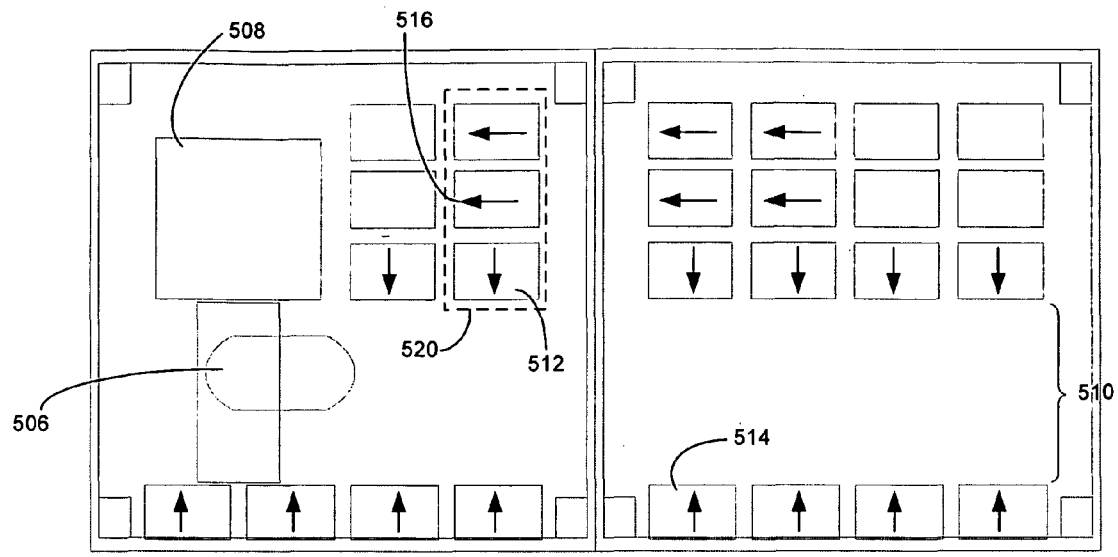
FIG. 5A shows a perspective view of a media storage library including a movable storage panel according to embodiments of the invention.
Figure 5B:
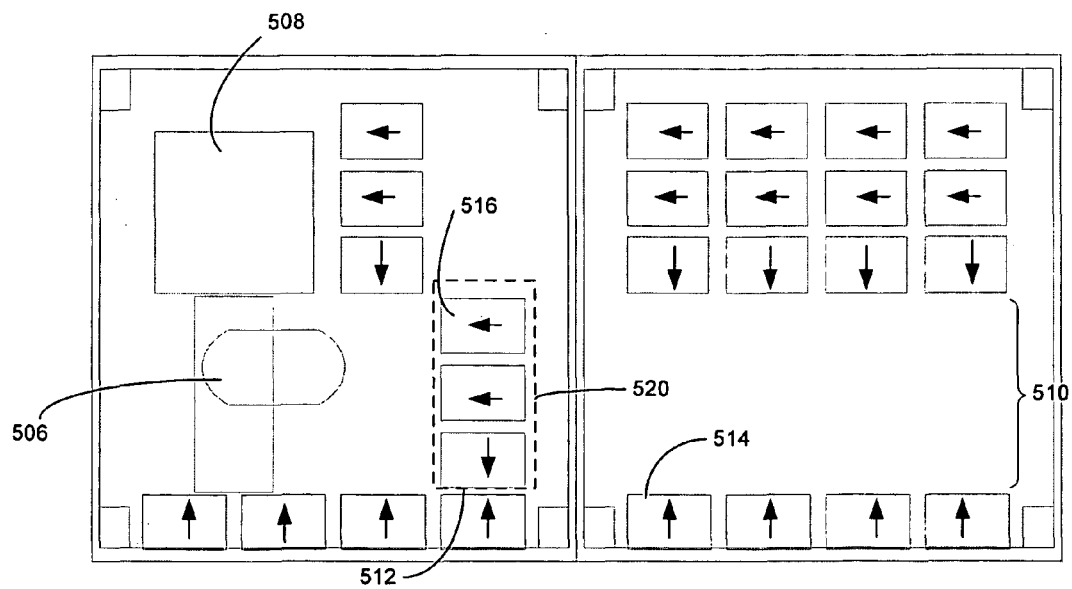
FIG. 5B shows a perspective view of a media storage library including a movable storage panel that is moved into the access space according to embodiments of the invention.

The movement of storage panels according to embodiments of the invention is illustrated in FIGS. 5A and 5B.

FIG. 5A shows a perspective view of a media storage library including a movable storage panel according to embodiments of the invention. FIG. 5B shows a perspective view of a media storage library including a movable storage panel that is moved into the access space according to embodiments of the invention.

A media transfer mechanism 506 is able to move through access space 510 and transfer media cartridges stored in the storage panels, e.g., storage panel 520, to the media drives 508. A first access face 512 and 514 of each of the plurality of storage panels line the access space 510. Each first access face 512 and 514 is oriented to face into the access space 510 when the storage panels are in a first position so that the media transfer mechanism 506 can access the media cartridges via the first access face 512 and 514. For example, first access faces 512 and 514 are able to be accessed by the media transfer mechanism 506 without moving any storage panels.

However, for a media cartridge stored in storage panel 520 to be accessible by a second access face 516, the storage panel 520 must be moved to a second position so that the second access face 516 is accessible by the media transfer mechanism 506. As with the previous embodiments, the first access face 512 and the second access face 516 of the storage panel 520 are angled relative to, e.g., are substantially perpendicular to, one another.

In FIG. 5B, storage panel 520 has been moved to the second position so that the media cartridges stored in storage panel 520, and accessible by second access face 516, can be accessed by the media transfer mechanism 506.

Figure 6:
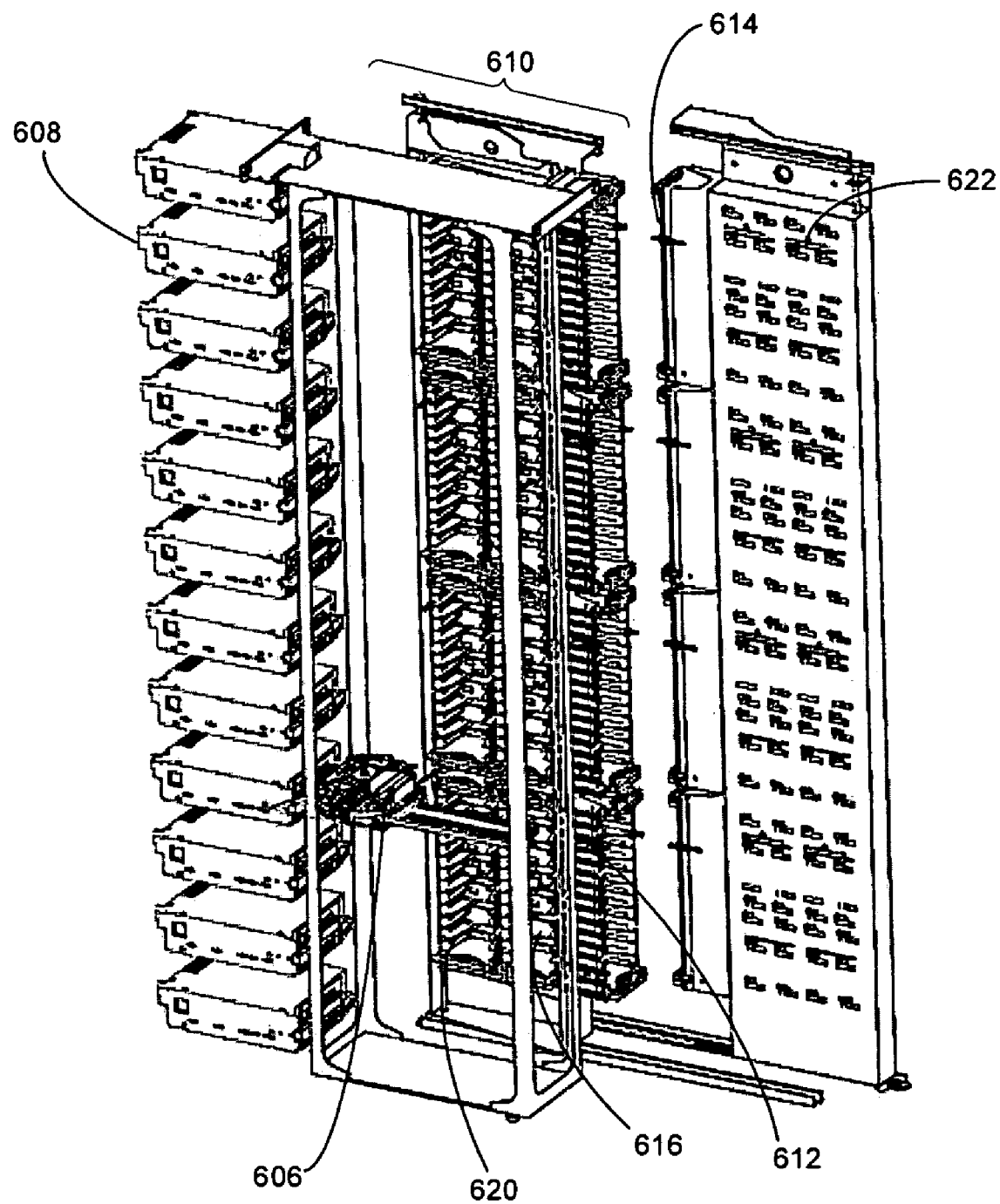
FIG. 6 shows a cutaway perspective view of a media transfer mechanism and storage panels of a media storage library according to embodiments of the invention.

FIG. 6 shows a cutaway perspective view of a media transfer mechanism and storage panels of a media storage library according to embodiments of the invention. In FIG. 6, a storage panel 620 is shown moved into the access space 610. Storage panel 622 is not in the access space 610. Storage panel 620 includes access face 616, which is accessible by the media transfer mechanism 606 in the configuration shown in FIG. 6. The media transfer mechanism may access media stored so that they are accessible from access face 616, and transfer the media cartridges to the media drives 608.

On the other hand, media cartridges accessible from access faces 612 and 614 may be accessed without moving either storage panel 620 and 622 into the access space 610.

Figure 7:
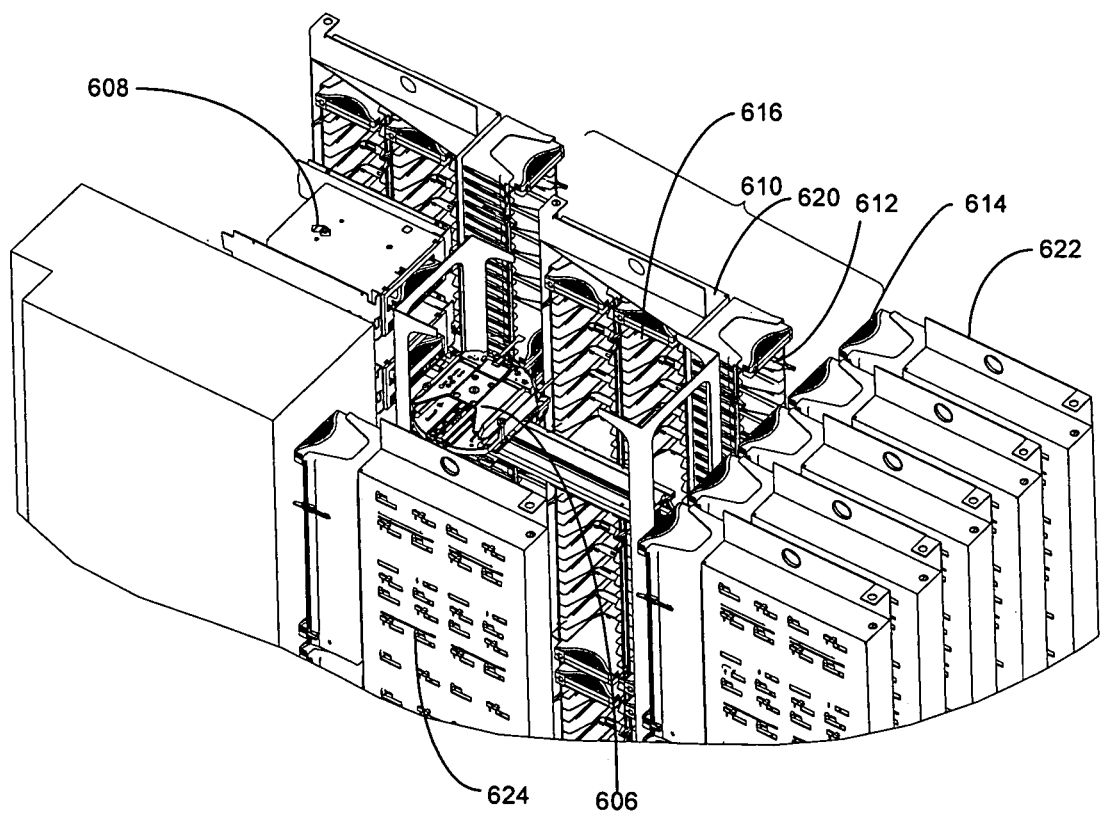
FIG. 7 shows a top perspective cutaway view of a media transfer mechanism and storage panels according to embodiments of the invention.

In a top perspective view illustrated in FIG. 7, storage panels 620 and 624 are shown in a position in the access space 610. The media transfer mechanism 606 may access the second access faces of storage panels 620 and 624. For example, access face 616 is accessible by the media transfer mechanism 606. In contrast, access face 612 is no longer accessible by the media transfer mechanism when storage panel 620 moved to this configuration.

Figure 8:
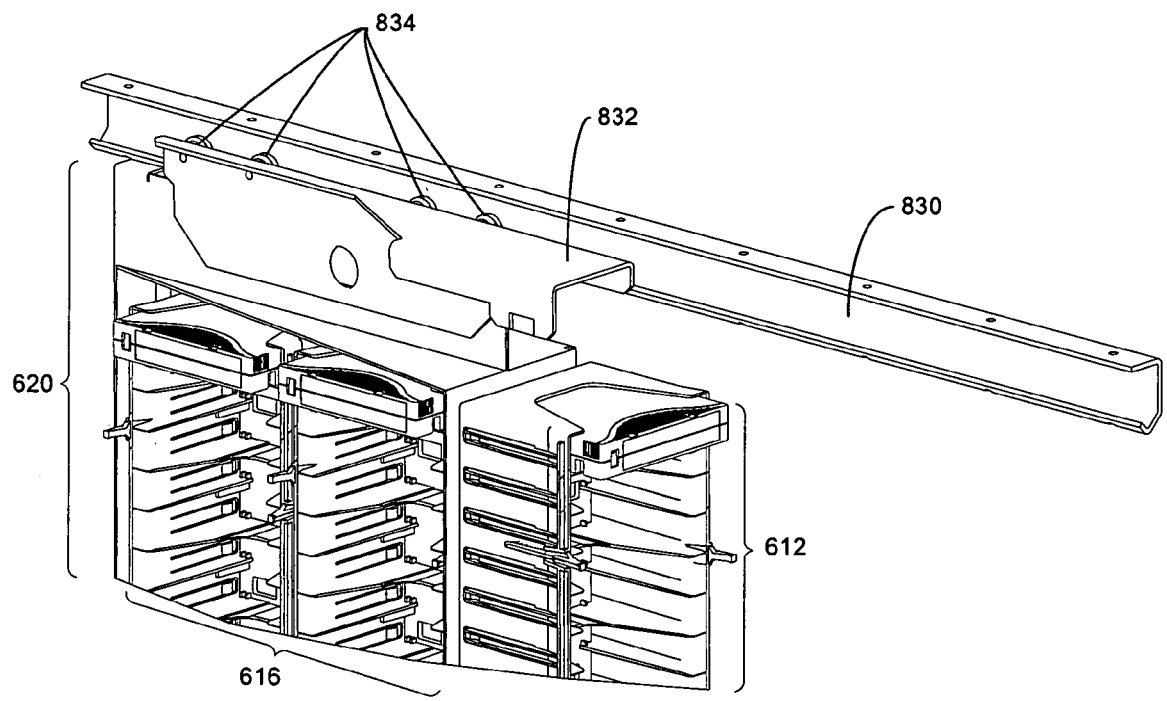
FIG. 8 shows a perspective view of an embodiment of a storage panel according to embodiments of the invention.

A movable storage panel 620 according to embodiments of the invention is illustrated in FIG. 8. The movable storage panel 620 has a first access face 612, and a second access face 616. In some embodiments, the storage panel 620 is movable linearly by rolling guide wheels, a rack and pinion system, or any type of linear movement mechanism, for example. A support 832 is connected to the storage panel 620. A track 830 installed in the storage library may guide the movable storage panel 620 by a movement mechanism, such as guide wheels 834, for example. The guide wheels 834 are connected to the storage panel 620 by a support 832. The movement mechanism may be, but is not limited to, guide wheels, or rack and pinion systems, for example. The media transfer mechanism or a separate motor may move the storage panel 620.

Figure 9:
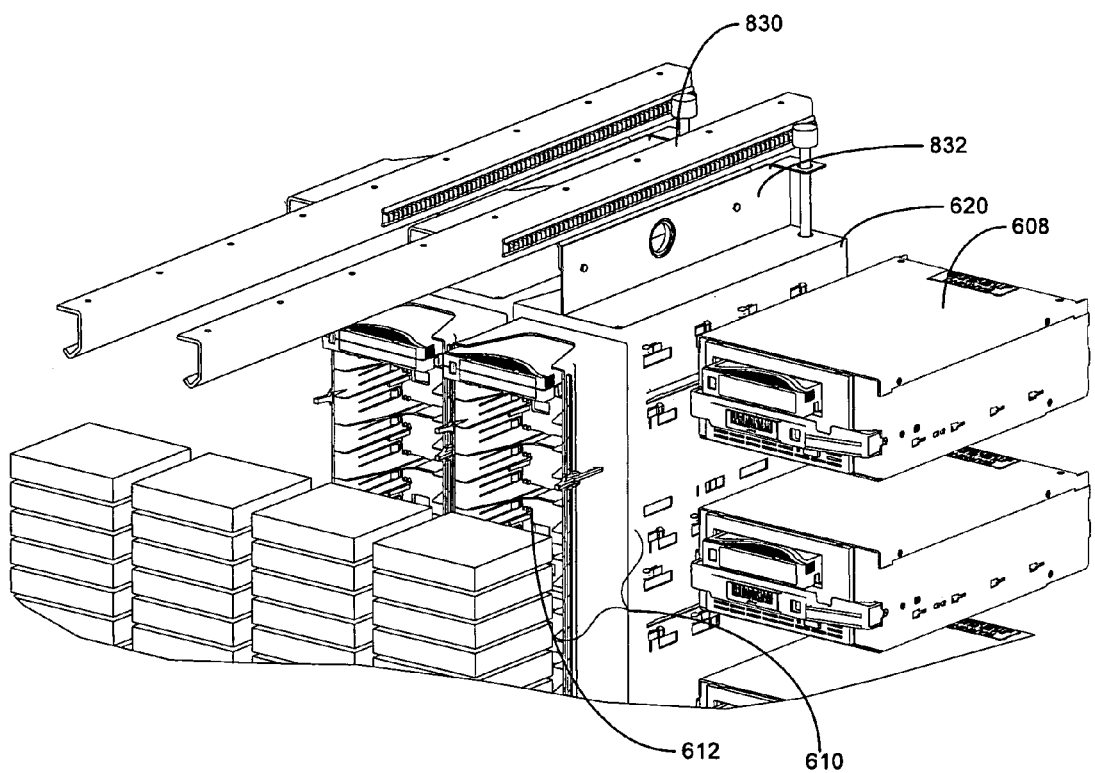
FIG. 9 shows a perspective view of an embodiment of storage panels and media drives according to embodiments of the invention.

In other embodiments, FIG. 9 shows a perspective view of movable storage panels and media drives according to embodiments of the invention. A support 832 connects the storage panel 620 to a movement mechanism, which allows storage rack 620 to move via a rack 830, which can be installed to connect to the storage library housing.

Figure 10:
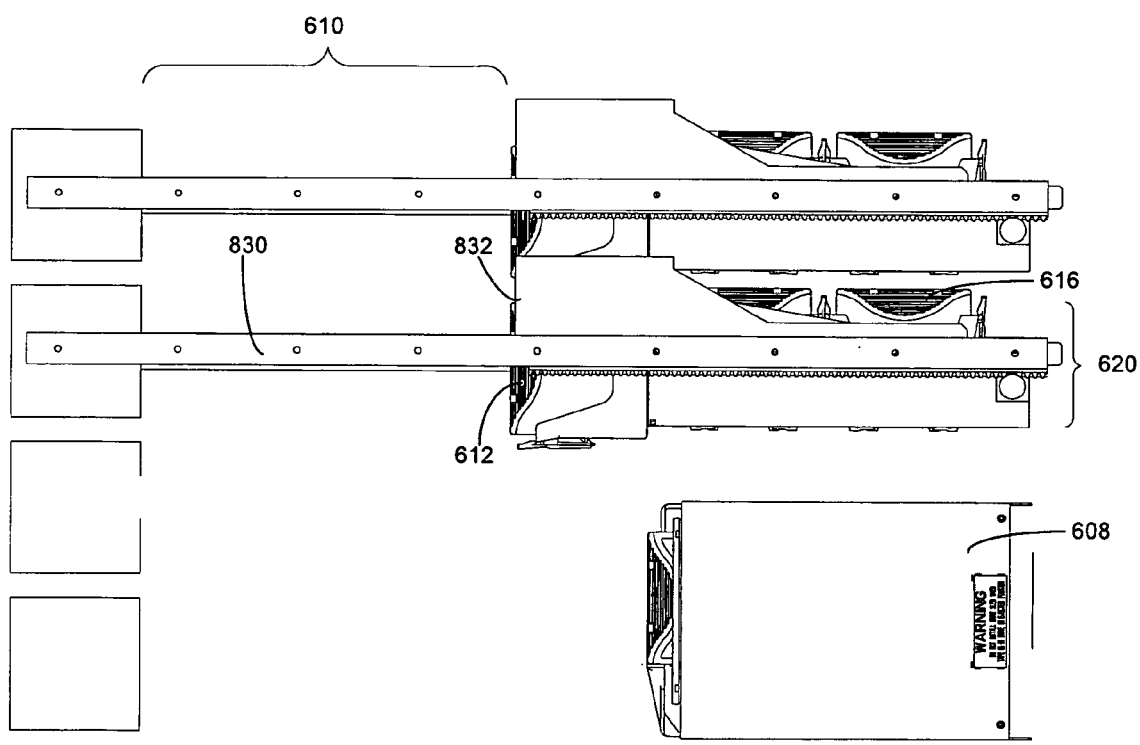
FIG. 10 shows a top perspective view of an embodiment of storage panels and a media drive according to embodiments of the invention.

FIG. 10 shows a top perspective view of an embodiment of storage panels. Storage panel 620 includes a first access face 612, and a second access face 616. Media cartridges accessible by access face 616 are retrieved or returned from storage panel 620 by a media transfer mechanism by linearly moving storage panel 620 into access space 610. A media transfer mechanism may then access the media cartridges accessible by access face 616 via the access space 610.

An automated storage cartridge library is typically interfaced to a computer system such as a computer network or the like. The storage library or interfaced computer system may index the location of the media cartridges and their associated stored data within the storage library for later retrieval of the stored information. When desired, the storage library may be activated to retrieve a desired storage media and load it into a drive to access the stored information and/or write new information. In large storage libraries multiple media drives are generally employed to increase access and storage performance by operating in parallel as well as providing back-up drives in case of failure, maintenance, and the like.

The foregoing description of the preferred embodiments of the invention has been presented for the purposes of illustration and description. It is not intended to be exhaustive or to limit the invention to the precise form disclosed. Many modifications and variations are possible in light of the above teaching. For example, in embodiments, fewer or greater numbers of movable storage panels may be provided in the automated storage library, depending on the desired storage density.

In addition, it is understood that in some embodiments of the invention, there may be more than one media transfer mechanisms in the automated storage library.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 11:
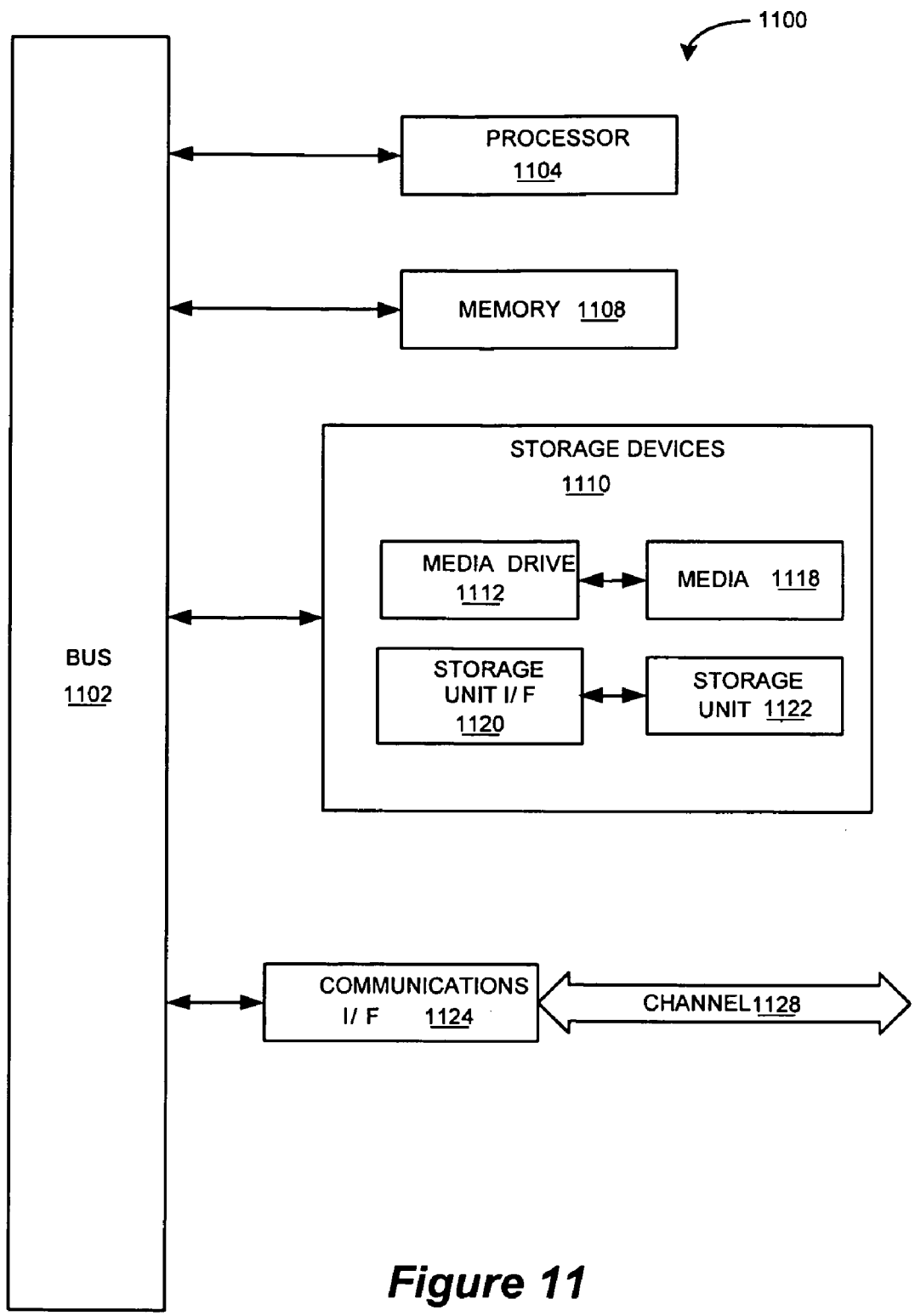
FIG. 11 shows a schematic block diagram of an exemplary circuitry of a media drive module and media storage library.

FIG. 11 illustrates an exemplary computing system 1100 that may be employed to implement processing functionality for various aspects of the invention (e.g., as a controller). Those skilled in the relevant art will also recognize how to implement the invention using other computer systems or architectures. Computing system 1100 may represent, for example, a desktop, mainframe, server, client, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communication medium.

Computing system 1100 can also include a main memory 1108, for example random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage mechanism 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118 may include, for example, a hard disk, floppy disk, magnetic tape, optical disk, CD or DVD, or other fixed or removable medium that is read by and written to by media drive 1114. As these examples illustrate, the storage media 1118 may include a computer-readable storage medium having stored therein particular computer software or data.

In alternative embodiments, information storage mechanism 1110 may include other similar instrumentalities for allowing computer programs or other instructions or data to be loaded into computing system 1100. Such instrumentalities may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical, or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 1108, storage device 1118, storage unit 1122, or signal(s) on channel 1128. These and other forms of computer-readable media may be involved in providing one or more sequences of one or more instructions to processor 1104 for execution. Such instructions, generally referred to as "computer program code" (which may be grouped in the form of computer programs or other groupings), when executed, enable the computing system 1100 to perform features or functions of embodiments of the present invention.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

The above detailed description is provided to illustrate various examples and is not intended to be limiting. It will be apparent to those of ordinary skill in the art that numerous modification and variations within the scope of the present invention are possible. For example, various examples described herein may be combined and altered. Further, numerous other devices and processes not explicitly described herein may be used with the exemplary cartridges and movable storage panels described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the claims and should not be limited by the description herein.

What is claimed is:

1. A media storage library comprising a plurality of media cartridges, the media storage library comprising:
    a media transfer mechanism;
    a first movable storage panel that stores a first media cartridge and a second media cartridge, the first movable storage panel including a first access face and a second access face that is substantially perpendicular to the first access face, the first movable storage panel being movable between a first position and a second position; and
    a second storage panel, wherein when the first movable storage panel is in the first position an access space is formed between the first movable storage panel and the second storage panel, and wherein when the first movable storage panel is in the second position the first movable storage panel has moved into the access space, wherein the media transfer mechanism is able to alternatively access (i) the first media cartridge via the first access face when the first movable storage panel is in the first position, and (ii) the second media cartridge via the second access face when the first movable storage panel is in the second position.

2. The media storage library of claim 1 wherein the media transfer mechanism moves translationally within the access space.

3. The media storage library of claim 1 wherein the first movable storage panel is movable in a linear direction between the first position and the second position.

4. The media storage library of claim 1 wherein the second access face is not accessible to the media transfer mechanism when the first movable storage panel is in the first position.

5. The media storage library of claim 1 wherein the second storage panel includes a first access face, and wherein the first access face of the first movable storage panel opposes the first access face of the second storage panel.

6. The media storage library of claim 5 wherein the second storage panel stores a third media cartridge, and wherein the media transfer mechanism is able to access the third media cartridge via the first access face of the second storage panel.

7. The media storage library of claim 1 wherein the second storage panel is movable from a first position to a second position.

8. The media storage library of claim 7 wherein the second storage panel stores a third media cartridge and a fourth media cartridge, the second storage panel including a first access face and a second access face that is angled relative to the first access face, and wherein the media transfer mechanism is able to alternatively access the third media cartridge via the first access face of the second storage panel when the second storage panel is in the first position and the fourth media cartridge via the second access face of the second storage panel when the second storage panel is in the second position.

9. The media storage library of claim 1 wherein the second storage panel is in a fixed position.

10. A method for accessing a first media cartridge and a second media cartridge within a media storage library, the method comprising the steps of:
    storing the first media cartridge and the second media cartridge in a first movable storage panel, the first movable storage panel including a first access face and a second access face that is substantially perpendicular to the first access face;

forming an access space between the first movable storage panel and a second storage panel when the first movable storage panel is in a first position;

accessing the first media cartridge with a media transfer mechanism via the first access face when the first movable storage panel is in the first position;

moving the first movable storage panel to a second position where the first movable storage panel is positioned substantially within the access space; and accessing the second media cartridge with the media transfer mechanism via the second access face when the first movable storage panel is in the second position.

11. The method of claim 10 wherein the step of moving includes the step of moving the first movable storage panel in a linear direction between the first position and the second position.

12. The method of claim 10 wherein the step of forming includes the second storage panel having a first access face, and wherein the first access face of the first movable storage panel opposes the first access face of the second storage panel.

13. The method of claim 12 further comprising the steps of storing a third media cartridge in the second storage panel, and accessing the third media cartridge with the media transfer mechanism via the first access face of the second storage panel.

14. The method of claim 10 further comprising the step of moving the second storage panel between a first position and a second position.

15. The method of claim 14 further comprising the steps of storing a third media cartridge and a fourth media cartridge in the second storage panel, the second storage panel including a first access face and a second access face that is angled relative to the first access face; accessing the third media cartridge with the media transfer mechanism via the first access face of the second storage panel when the second storage panel is in the first position; and accessing the fourth media cartridge with the media transfer mechanism via the second access face of the second storage panel when the second storage panel is in the second position.

16. The method of claim 10 wherein the step of forming includes the second storage panel being in a fixed position.

17. A media storage library comprising a plurality of media cartridges, the media storage library comprising:

a media transfer mechanism;

a first movable storage panel that stores a first media cartridge and a second media cartridge, the first movable storage panel including a first access face and a second access face that is substantially perpendicular to the first access face, the first movable storage panel being movable between a first position and a second position;

a second storage panel for storing a third media cartridge and a fourth media cartridge, the second storage panel including a third access face and a fourth access face that is angled relative to the third access face, the second storage panel being movable between a first position and a second position, wherein an access space is formed between the first movable storage panel and the second storage panel when the first movable storage panel is in the first position and the second storage panel is in the first position, wherein when the first movable storage panel is in the second position the first movable storage panel has been moved into the access space, wherein when the second storage panel is in the second position the second storage panel has been moved into the access space, and wherein the media transfer mechanism is able to alternatively access (i) the first media cartridge via the first access face when the first movable storage panel is in the first position, (ii) the second media cartridge via the second access face when the first movable storage panel is in the second position, (iii) the third media cartridge via the third access face when the second storage panel is in the first position, and (iv) the fourth media cartridge via the fourth access face when the second storage panel is in the second position.

18. The media storage library of claim 17 wherein the first access face opposes the third access face, and wherein the third access face and the fourth access face are substantially perpendicular to one another.

\* \* \* \* \*